United States Patent [19]

Yoshida

[11] Patent Number: 5,719,683

[45] Date of Patent: Feb. 17, 1998

[54] ENGRAVING HEAD CONTROL DEVICE FOR INITIAL POSITIONING OF A GRAVURE ENGRAVING HEAD

[75] Inventor: Takumi Yoshida, Kyoto, Japan

[73] Assignee: Dainippon Screen Mfg., Ltd., Japan

[21] Appl. No.: 309,858

[22] Filed: Sep. 21, 1994

[30] Foreign Application Priority Data

Sep. 22, 1993 [JP] Japan .................................. 5-236093

[51] Int. Cl.$^6$ .................................................. B41C 1/02
[52] U.S. Cl. .................................................... 358/299
[58] Field of Search ............................ 358/299, 474.16,
358/474.19, 474.22, 474.26, 474.28, 474.35,
474.37; 409/64, 72, 75, 94, 131, 207; 318/603,
632, 638, 640, 652; 356/372–387

[56] References Cited

U.S. PATENT DOCUMENTS

| | | | |
|---|---|---|---|
| 5,424,845 | 6/1995 | Bornhorst, Jr. et al. | 358/299 |
| 5,454,306 | 10/1995 | Fraser et al. | 358/299 X |
| 5,652,659 | 7/1997 | Bornhorst, Jr. et al. | 358/299 |

*Primary Examiner*—Eric Frahm

*Attorney, Agent, or Firm*—Ostrolenk, Faber, Gerb & Soffen, LLP

[57] ABSTRACT

An engraving mechanism for engraving gravure cylinders having an engraving head, an engraving head movement mechanism, a sensor coupled to the movement mechanism for sensing the relative position between the engraving head and the gravure cylinder, and a control unit connected to the sensor and the movement mechanism. The control unit has a CPU and memory to store data related to the engraving of one or more gravure cylinders to determine the length of the cylinder in response to movement of the engraving head and sensor information from the sensor, to determine an initial position for positioning the engraving head prior to each engraving operation based upon the length and diameter of the gravure cylinder, and to determine a gap between the engraving head and the cylinder prior to engraving. After the controller unit computes the diameter and length of the cylinder, it controls the movement mechanism to adjust a gap between the engraving head and the gravure cylinder and to position the engraving head lengthwise to the cylinder in an engraving start position. Thus, the engraving start position and the initial gap are automatically varied from one gravure cylinder to another.

17 Claims, 15 Drawing Sheets

ENGRAVING HEAD CONTROL DEVICE FOR INITIAL POSITIONING OF A GRAVURE ENGRAVING HEAD

BACKGROUND OF THE INVENTION

The present invention relates to an engraving head control device, more particularly, it relates to an engraving head control device in a gravure engraving machine, which determines dimensions of a gravure cylinder and positions an engraving head in an initial position based upon at least one determined dimension for engraving the surface of a gravure cylinder in accordance with data on portions of an image to be engraved.

DESCRIPTION OF THE RELATED ART

Printing a page in a magazine or other such printed material where multiple colors are required is typically accomplished using gravure printing processes. Gravure printing processes typically require the use of a plurality of gravure cylinders, each cylinder engraved to conform to part of the total image to be printed. Each cylinder is engraved to subsequently print one of the plurality of colors which make up a multi-color print.

A gravure engraving machine is an apparatus which includes means for mounting and engraving the surface of a plurality of gravure cylinders, one at a time, the cylinders intended to be used in a gravure printing process. Such an apparatus includes means for revolving, or indexing the cylinder while a diamond bit or "stylus" engraves the surface of the gravure cylinder to form small cavities known in the aft as cells. The size and depth of each cell is important as the size and depth of each cell determines the amount of ink each cell will subsequently hold during a printing process. When a plurality of cylinders are engraved and intended for use in a single printing process, it is important that all of the cylinders be indexed properly with respect to one another, so that in the subsequent printing process, the cells are in proper registration with one another to form the desired printed images.

A gravure engraving machine typically includes a bed, a spindle stock fixed to an upper surface of the bed, a tail stock opposed to the spindle stock and cooperative with the spindle stock to rotatably support a gravure cylinder, and an engraving head for engraving the surface of the gravure cylinder.

The engraving head is supported by a head supporting mount which is pivotally supported on the bed about a horizontal axis parallel to the rotation axis about which the gravure cylinder rotates. In an operative state, a pushing element, such as a spring, biases the engraving head toward the gravure cylinder. The head supporting mount is movable along the axis parallel to the rotation axis of the gravure cylinder and may also advance and retract to and from the surface of the gravure cylinder. This allows the engraving head to be selectively advanced toward or retracted away from the gravure cylinder and moved in directions along the rotation axis of the gravure cylinder. The engraving head is provided with a stylus for engraving and a sliding shoe for keeping a fixed gap between the stylus and the gravure cylinder. The engraving table is provided with a drilling screw for forcing the engraving head to advance to or retract from the surface of the gravure cylinder.

In this type of gravure engraving machine, when a cylinder is to be engraved, the engraving head is typically put in an engraving start position after attachment of the gravure cylinder to the machine, and then, the drilling screw is turned to advance the head and stylus toward the gravure cylinder. Such procedures are all manual operations. The engraving head is slightly tilted by the pushing member as previously stated, and as the sliding shoe contacts an outer surface of the gravure cylinder, the engraving head becomes gradually upright as the spring is compressed. The drilling screw is turned to advance the engraving head till the engraving head stands erect, so that the gap between the engraving head and the gravure cylinder is set to an appropriate value, thus, the engraving head is set on an initial position.

After setting the gap is completed, the gravure cylinder is revolved while the engraving head is moved along a line parallel to the axis of rotation of the cylinder, to perform engraving. When the engraving is completed, the drilling screw forces the engraving head to retract away from the surface of the gravure cylinder. This is because the gravure cylinder must be prevented from coming into contact with the engraving head when removing the gravure cylinder from the engraving machine.

In the prior art arrangement described above, it is necessary to manually attach to and detached each cylinder in succession from the engraving machine, rotate the drilling screw to draw the engraving head toward the cylinder in order for the sliding shoe to contact the outer surface of the gravure cylinder. However, turning the drilling screw to advance the engraving head results in an inconsistency with regard to the initial position of the engraving head from cylinder to cylinder. For instance, depending upon skill of the operator, as the tip of the sliding shoe contacts the surface of the gravure cylinder, the spring is slightly compressed. The amount of spring compression varies among operators resulting in variations in angular attitude of the engraving head. Hence, sometimes an edge of the sliding shoe may damage the surface of the gravure cylinder, or a gap may exist between the engraving head and the cylinder that may vary the shape and/or size of cells subsequently formed on each cylinder.

Also, in the prior art arrangement, the engraving head is manually moved to an engraving start position at some point along a line parallel to the axis of rotation of the cylinder. Due to the manual setting of this position, similar to the above case, variations may be experienced in the engraving start position from cylinder to cylinder. Thus, when the engraving start position varies from impression of one color to that of another color for a single printing process where multiple cylinders are used, image regions on gravure cylinders for the impressions of those individual colors may differ from one another. If an error of the image region among the impressions of various colors can not be regulated by an adjusting a portion of the gravure printing machine, the cells must be engraved over again.

Accordingly, it is an object of the present invention to overcome the deficiencies associated with manual adjustment of the initial position of the engraving head in a gravure engraving machine. Specifically, an object of the present invention is to reduce the variations caused by manual adjusting of the distance between the engraving head and the gravure cylinder and the linear position of the engraving head with respect to the length of the gravure cylinder.

SUMMARY OF THE INVENTION

In one aspect of the present invention, an engraving head control device controls the position of an engraving head in a gravure engraving machine. The engraving head control device positions the engraving head in accordance with engraving data. For instance, an initial position of the engraving head with respect to the engraving surface of a gravure cylinder is determined by the engraving head control device based upon the engraving data.

The engraving head control device includes a first moving means for controlling the position of the engraving head along a lengthwise portion of the cylinder, a second moving means for controlling the distance between the engraving head and the gravure cylinder, an initial position computing means and a position controlling means. The initial position controlling means processes data to determine the initial position of the engraving head with respect to the gravure cylinder. The position controlling means, at the beginning of engraving, controls the first and second moving means in accordance with the data on the initial position determined by the initial position computing means to move the engraving head to its initial position.

In a second aspect of the invention, the engraving head control device adjusts an initial gap between the gravure cylinder and the engraving head prior to engraving surface of the gravure cylinder. The control device includes a head moving means, a computing means and a position controlling means and further includes a sensing means coupled to the engraving head to move therewith, providing the computing means with detecting signals which indicate relative position of the engraving head with respect to the gravure cylinder. The computing means uses the detecting signals to determine the diameter of the gravure cylinder. The position controlling means controls the head moving means to set the position of the engraving head in accordance with the diameter so as to keep the gap between the gravure cylinder and the engraving head at a generally specified value during a subsequent engraving process.

The engraving head control device in a third aspect of the present invention, adjusts an engraving start position of the engraving head in a direction along an axis of a gravure cylinder in accordance with engraving data on engraving. The engraving head control device includes a sensing means, a head moving means, a computing means and a position controlling means. The sensing means generates detection signals which indicate a length of the gravure cylinder in its axial direction. The head moving means moves the engraving head in a direction along an axis of the gravure cylinder. The computing means computes the length of the gravure cylinder and an engraving start position in accordance with detection signals from the sensing means and the engraving data. The position controlling means controls the head moving means in accordance with a result of computation by the engraving initial position computing means so as to put the engraving head in the engraving start position.

In the engraving head control device, during the engraving process, the position controlling means controls the first and second moving means in accordance with the initial position data to move the engraving head to the initial position. Since the engraving head is automatically moved to the initial position, there are less variations in initial gap and engraving start position.

In the engraving head control device, when the sensing means detects the outer circumference position of the gravure cylinder, the computing means computes a diameter of the gravure cylinder attached to the gravure engraving machine. Then, in accordance with a result of computation by the computing means, the position controlling means controls the head moving means so as to keep the gap in a specified value.

Since the gap is adjusted in accordance with the diameter of the gravure cylinder, an optimum gap between the gravure cylinder and the engraving head can be provided in accordance with the gravure cylinder attached to the gravure engraving machine.

In the engraving head control device, when the sensing means detects a length of the gravure cylinder along its axial direction, the computing means computes the length of the gravure cylinder and computes an engraving start position based upon the engraving data and the length of the gravure cylinder. Since the engraving start position is determined using the length of the gravure cylinder and the engraving data, variations in the gravure initial position are reduced.

DETAILED DESCRIPTION OF THE PREFERRED EMBODIMENT

Figure 1:
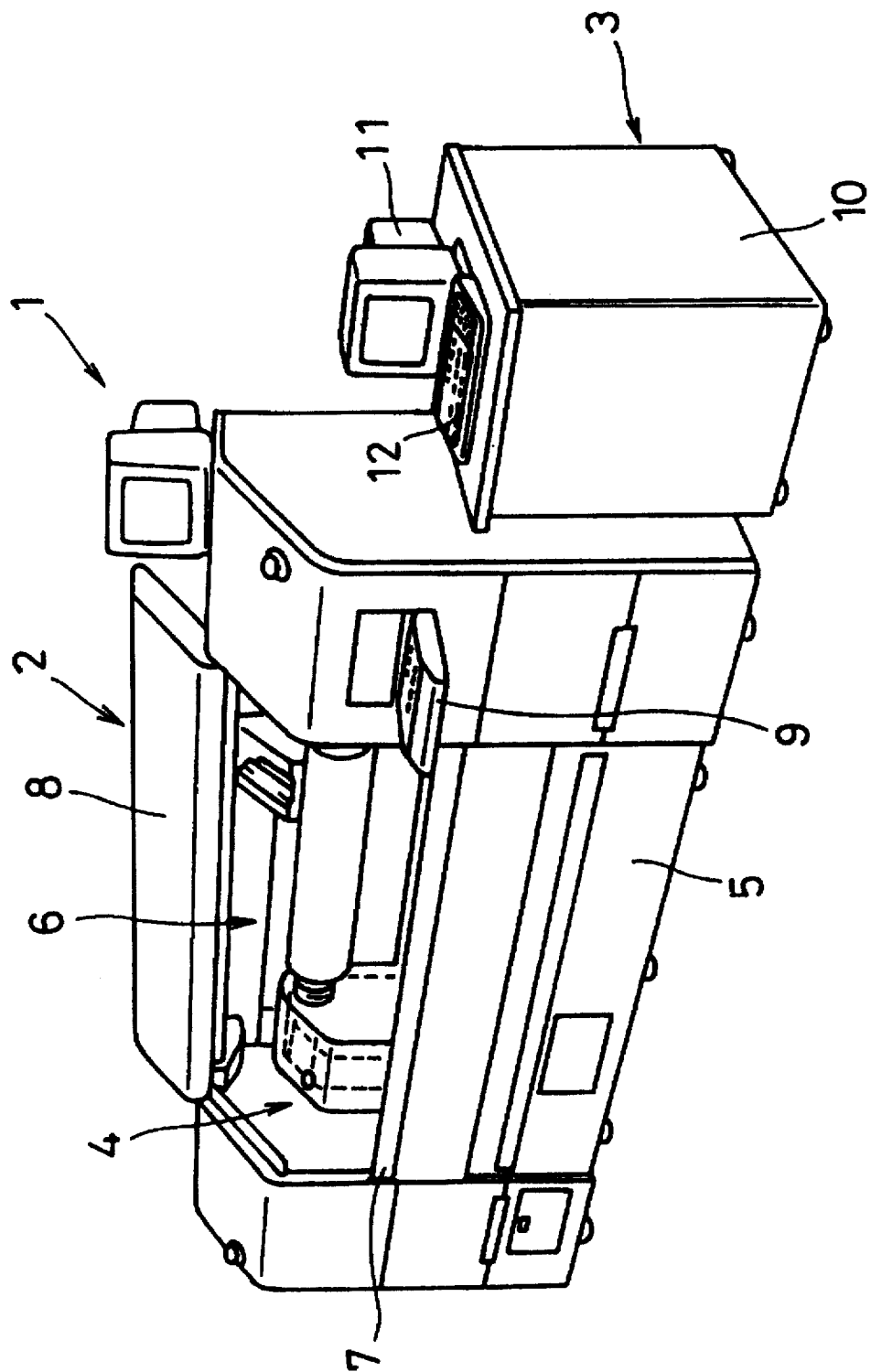
FIG. 1 is a perspective view showing a gravure engraving machine in one aspect of the present invention.

In one aspect of the present invention, a gravure engraving machine 1 is depicted in FIG. 1, wherein like reference numerals depict like elements throughout the figures. The gravure engraving machine 1 includes an engraving unit 2 and a control unit 3 connected to and positioned beside the engraving unit 2. The engraving unit 2 has a main engraving unit 4 and a cabinet 5 enclosing the main engraving unit 4. In the center of the cabinet 5, an opening 6 is formed, and the opening 6 is covered by a slide cover 7 and a safety cover 8. In the upper right of the cabinet 5 in FIG. 1, an operation panel 9 is attached.

The control unit 3 is comprised of a main controller 10 including a CPU, ROM and RAM, and a display 11 and a keyboard 12 on the main controller 10.

Figure 2:
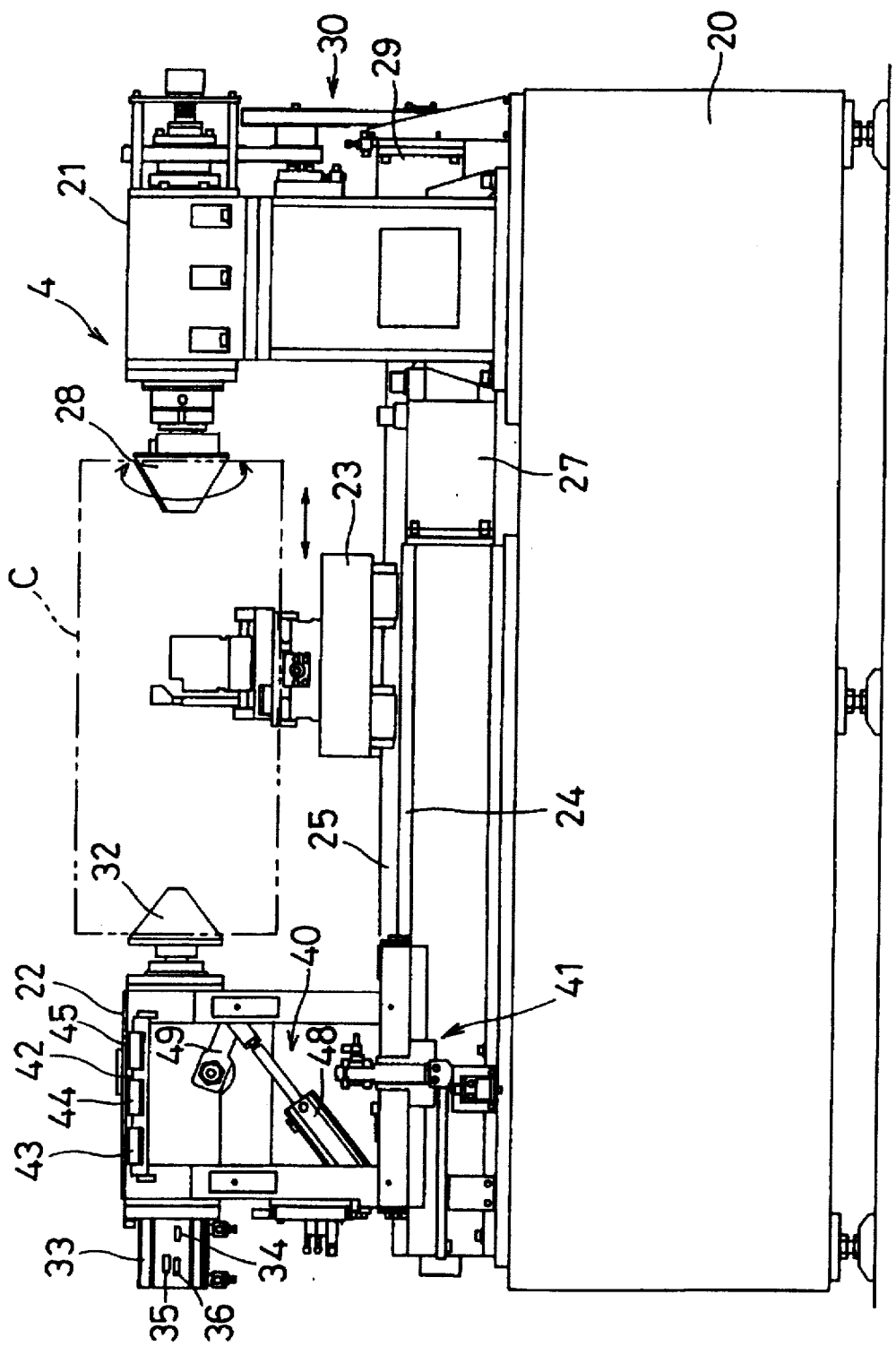
FIG. 2 is a front elevation showing a main engraving unit of the engraving machine.
Figure 3:
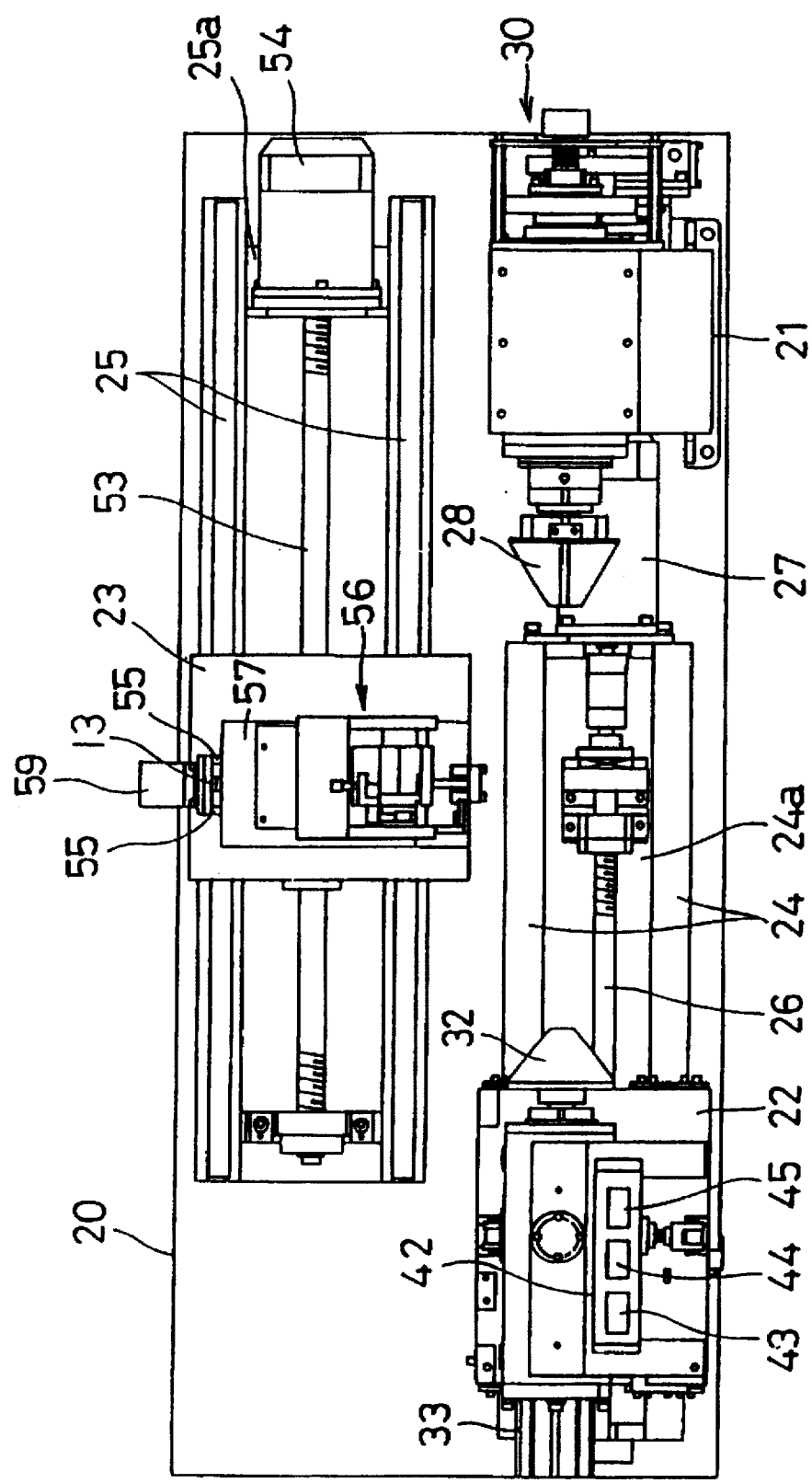
FIG. 3 is a top plan view showing the main engraving unit of the engraving machine.
Figure 4:
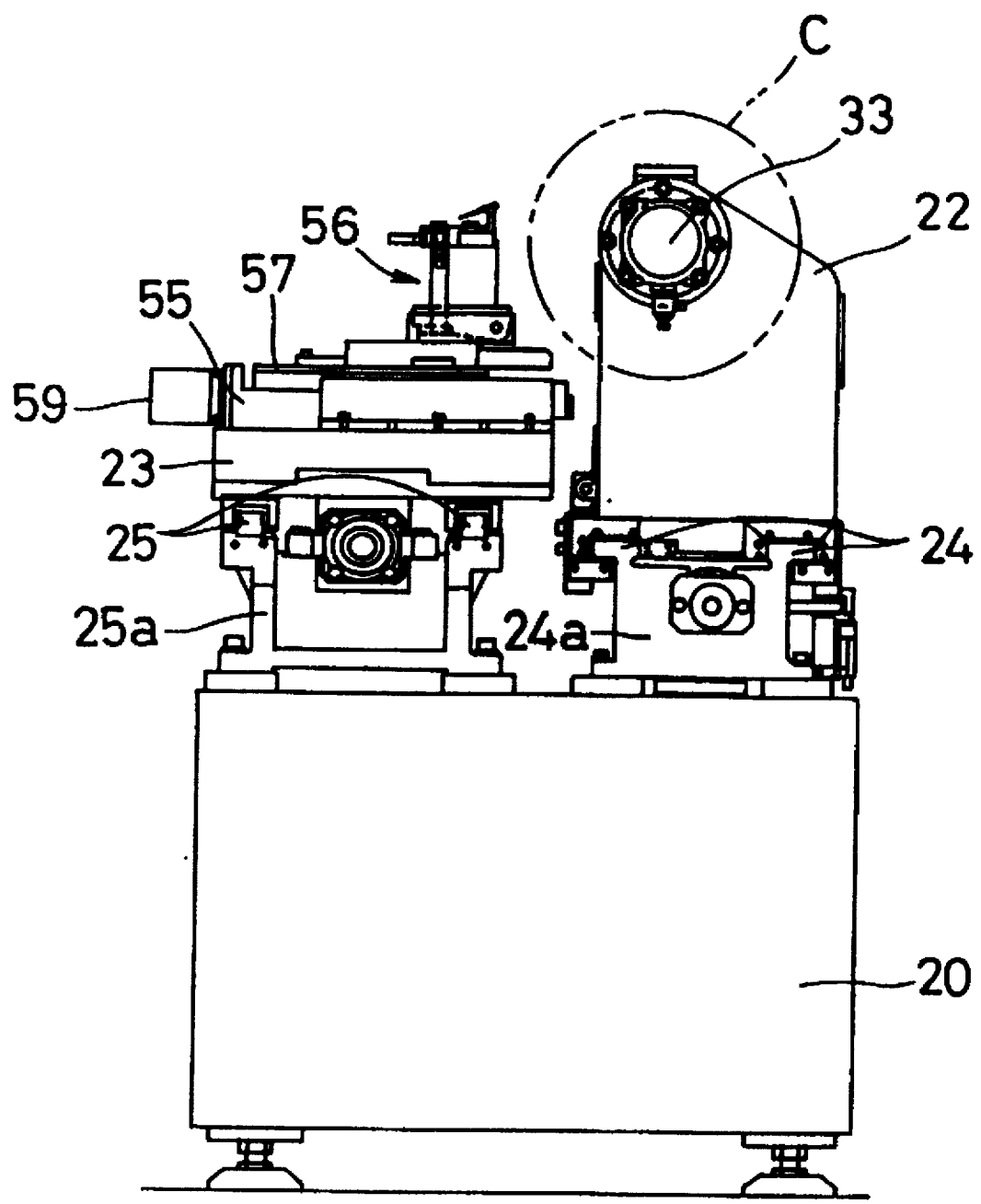
FIG. 4 is a left side view showing the main engraving unit of the engraving machine.

The main engraving unit 4, as shown in FIGS. 2–4, includes a bed 20, a spindle stock 21, a tail stock 22 opposed to the spindle stock 21 and an engraving table 23, all coupled to the upper surface of the bed 20, as is described in greater detail below. On the upper surface of the bed 20, a pair of guide rails 24 are mounted for guiding the tail stock 22. Another pair of guide rails 25 are mounted on the upper surface of the bed 20 for guiding the engraving table 23, both the pairs of rails 24 and 25 are disposed in parallel with each other in lateral directions of FIG. 3. The guide rails 24 are disposed on opposite upper portions of a rail mount 24a on a front half (the lower portion of FIG. 3) of the bed 20 while the guide rails 25 are disposed on opposite upper portions of a rail mount 25a on a rear half (the upper portion of FIG. 3) of the bed 20. Under the tail stock 22 between the guide rails 24, a drilling screw 26 is put in parallel with the guide rails 24, and a threaded nut (not shown) provided in a lower portion of the tail stock 22 is fitted on the drilling screw 26. A tail stock motor 27 for driving the tail stock 22 is attached to one terminal of the drilling screw 26 proximate to the spindle stock 21. Due to the motor 27, the tail stock 22 is adjustable to advance toward or retract away from the spindle stock 21.

In the center of the spindle stock 21, a spindle 28 is rotatably held. The spindle 28 is revolved by a drive mechanism 30 including a spindle motor 29 and belt on one side of the spindle stock 21.

Figure 5:
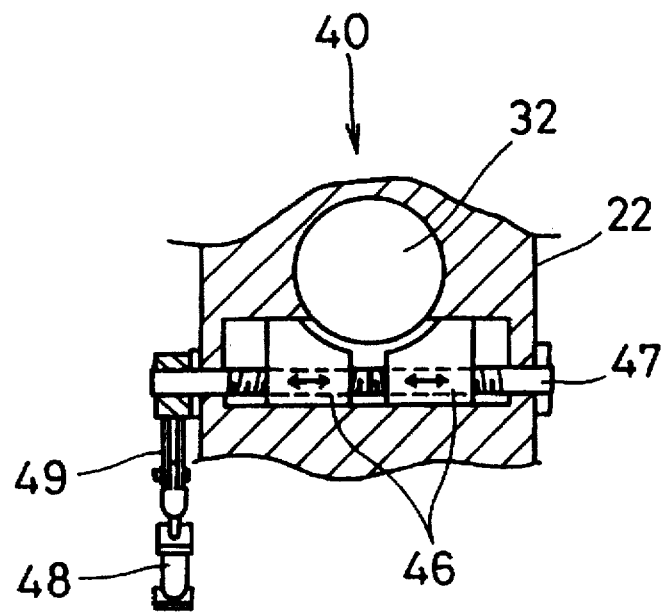
FIG. 5 is a partial section showing a quill lock mechanism.

As is shown in FIGS. 2 and 5, in the center of the tail stock 22, a quill 32 is rotatably held so that it can be advanced and retracted while it is revolving. A quill cylinder 33 operated by air pressure is attached to a rear side of the tail stock 22, and the quill cylinder 33 causes the quill 32 to advance and retract. The spindle 28 and the quill 32 have their respective corn-shaped ends opposed to each other. A gravure cylinder C is held between the spindle 28 and the quill 32. A quill-distal-end detecting sensor 34, a quill-proximate-end detecting sensor 35 and a quill-intermediate-section detecting sensor 36 are mounted in the quill cylinder 33. These three sensors 34 to 36 detect advancing and retracting positions of the quill 32. The tail stock 22 is provided with a quill lock mechanism 40, a tail stock lock mechanism 41 and a switch panel 42. A tail stock advancing switch 43, a quill retiring switch 44 and a tail stock retiring switch 45 are arranged in the switch panel 42.

The quill lock mechanism 40, which prevents the quill 32 from receding when the power is off, has a pair of lock members 46 (FIG. 5) capable of advancing to or retracting from a lower portion of the outer surface of the quill 32 within the tail stock 22. The quill lock mechanism also has a screw shaft 47 formed with a pair of screws threaded reverse to each other for forcing the lock members 46 to proceed to and recede from the outer surface of the quill 32, and a quill lock cylinder 48 for revolving the screw shaft 47, as shown in FIG. 5. The quill lock cylinder 48 and the screw shaft 47 are connected by a lever 49. Contraction of the quill lock cylinder 48 causes the screw shaft 47 to revolve, which, in turn, moves the lock members 46 in directions shown by arrows. The pair of lock members 46, holding the quill 32 between them, lock up the quill 32 in the tail stock 22.

The quill lock cylinder 48 is connected via an electromagnetic valve not shown to a compressor also not shown. The electromagnetic valve supplies air pressure to the quill lock cylinder 48 to expand the quill lock cylinder 48 while the power is on or otherwise contracts the quill lock cylinder 48 while the power is off. Hence, when the gravure engraving machine 1 Is turned on, the electromagnetic valve turns on, and the quill lock cylinder 48 expands. In this situation, the quill 32 is unlocked. Meanwhile, when the gravure engraving machine 1 is turned off, the electromagnetic valve turns off, the quill lock cylinder 48 is supplied with air pressure from the compressor to contract it, and thus, the quill 32 is locked. Even if the power is off in the compressor because of power failure, for example, compressed air still remains in the compressor, and therefore, the quill lock cylinder 48 is supplied with air pressure.

Figure 6:
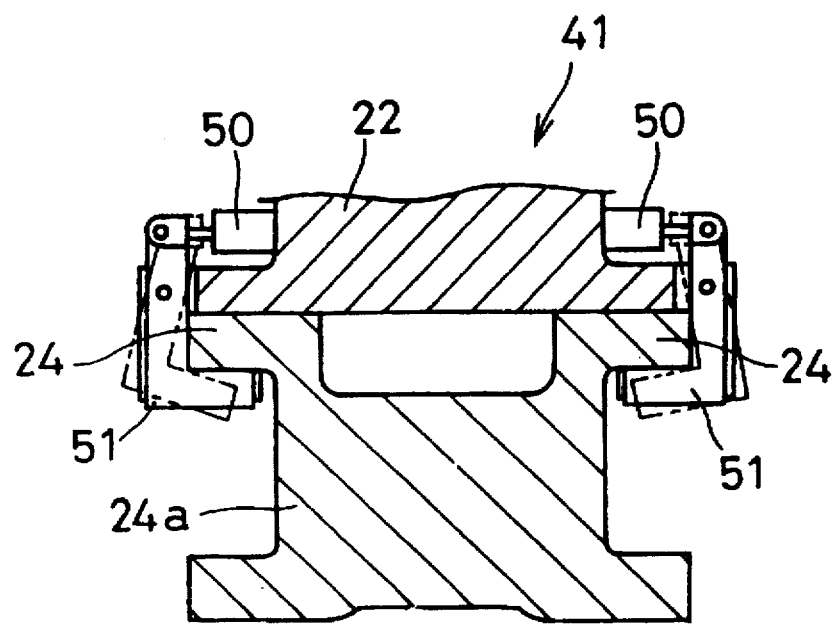
FIG. 6 is a partial section showing a tail stock lock mechanism.

As shown in FIG. 6, the tail stock lock mechanism 41 has tail stock lock cylinders 50 horizontally placed on opposite sides of the tail stock 22, and lock members 51 attached to tips of rods of the tail stock lock cylinders 50 pivotally thereabout. The lock members 51 are L-shaped elements which are adapted to pivot between a lock position, shown by the solid line, and an unlock position, shown in phantom in FIG. 6. Putting the lock members 51 in their respective lock positions, the tail stock 22 is locked on the guide rails 24.

The engraving table 23 is slidable along the guide rails 25 in the lateral directions, as shown in FIG. 3. Between the pair of the guide rails 25, a drilling screw 53 is provided in parallel with the guide rails 25. In a lower portion of the engraving table 23, a threaded nut (not shown) fitted on the drilling screw 53 is fixed. A layshaft motor 54 is fixed to one end of the drilling screw 53. The layshaft motor 54 revolves the drilling screw 53 so as to slide the engraving table 23 along on the guide rails 25 in the lateral directions.

As shown in FIG. 3 and FIG. 4, a pair of guide rails 55 are mounted on the engraving table 23. The guide rails 55 lie in longitudinal directions orthogonal to the guide rails 25. A head supporting mount 57, which pivotally supports the engraving head 56, is movably mounted on the guide rails 55. Between the pair of the guide rails 55, a drilling screw 13 is put in parallel with the guide rails 55, having its one end connected to a stepping motor 59 which revolves the drilling screw 13. In a lower portion of the head supporting mount 57, a threaded nut (not shown) fitted on the drilling screw 13 is fixed. With such an arrangement, the engraving head 56 is moved forward and backward (i.e., in the longitudinal directions of FIG. 3) so as to proceed to and receded from the gravure cylinder C.

Figure 7:
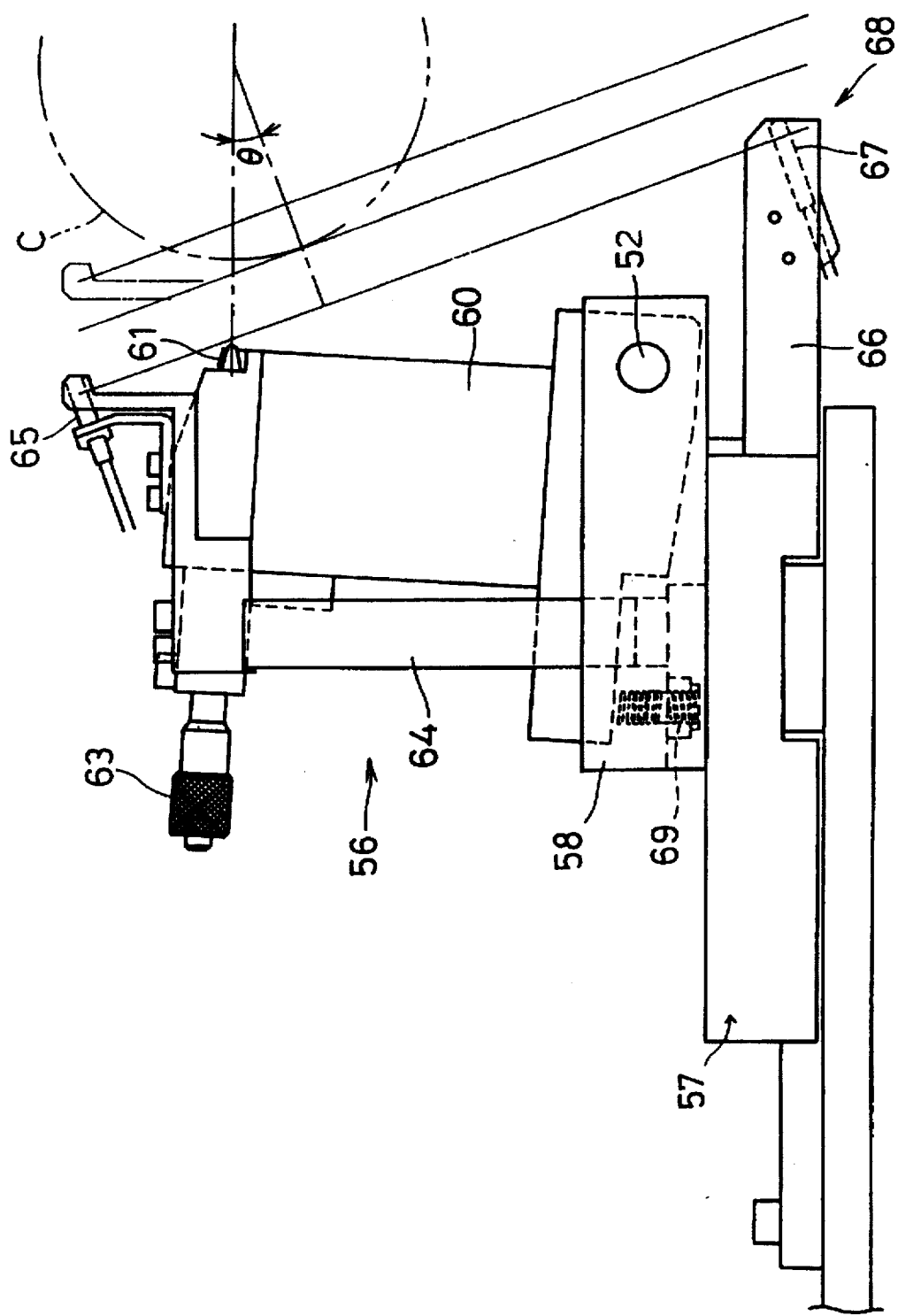
FIG. 7 is an enlarged side view showing an engraving head.
Figure 8:
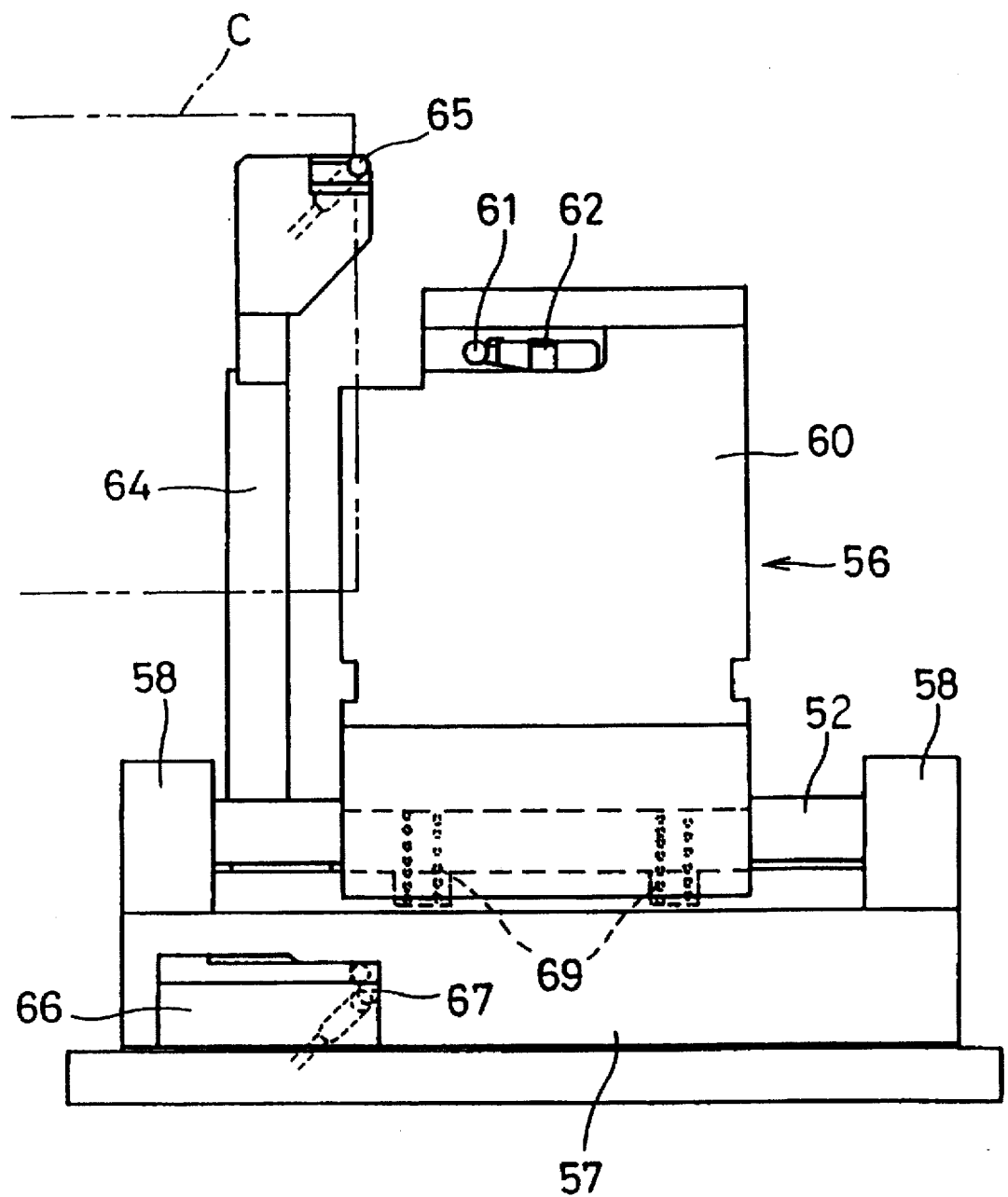
FIG. 8 is a front elevation showing the engraving head.

As can be seen in FIG. 7 and FIG. 8, a symmetrical pair of bearing blocks 58 are mounted on an upper surface of the head supporting mount 57. Shafts 52 are pivotally attached to front ends of the bearing blocks 58. The shafts 52 are further fixed to a head body 60 of the engraving head 56. A biasing spring 69 is retained compressed between a lower rear end of the head body 60 and the head supporting mount 57. On a front side of the head body 60, a sliding shoe 61 and a stylus 62 are put in position. The sliding shoe 61 is adjustable in its projection length by an adjusting screw 63 attached to a rear side of the head body 60. The adjusting screw 63 effectively works to adjust the gap between the stylus 62 and the gravure cylinder C. When the sliding shoe 61 is not touching the gravure cylinder C the head body 60 is tilted forward by the biasing spring 69, as illustrated by solid line in FIG. 7.

On the left of the head body 60 in FIG. 8, an upright L-shaped sensor frame 64 is placed. A light emitter 65 of an optical sensor is attached to a distal end of the sensor frame 64. The light emitter 65 emits light 20 deg. downward from its vertical face. On a left end of the head supporting mount 57 in FIG. 8, a sensor frame 66 is mounted projecting forward, A light receiver 67 of the optical sensor is attached to a distal end of the sensor frame 66. A cylinder detecting sensor 68 for detecting an outer circumference position of the cylinder is comprised of the light emitter 65 and the light receiver 67.

Figure 9:
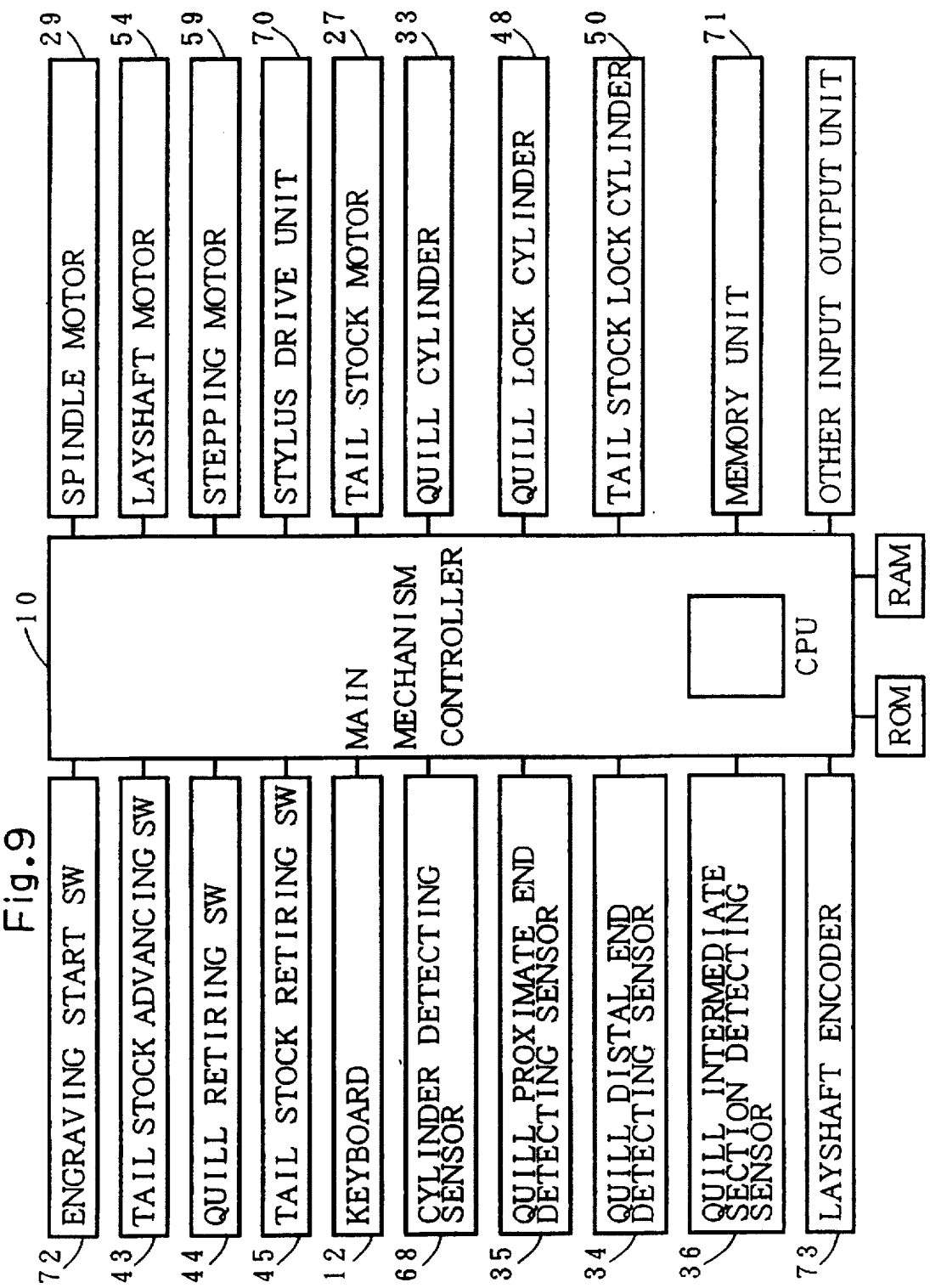
FIG. 9 is a block diagram showing the system architecture of a control unit attached to the engraving unit of the present invention.
Figure 10:
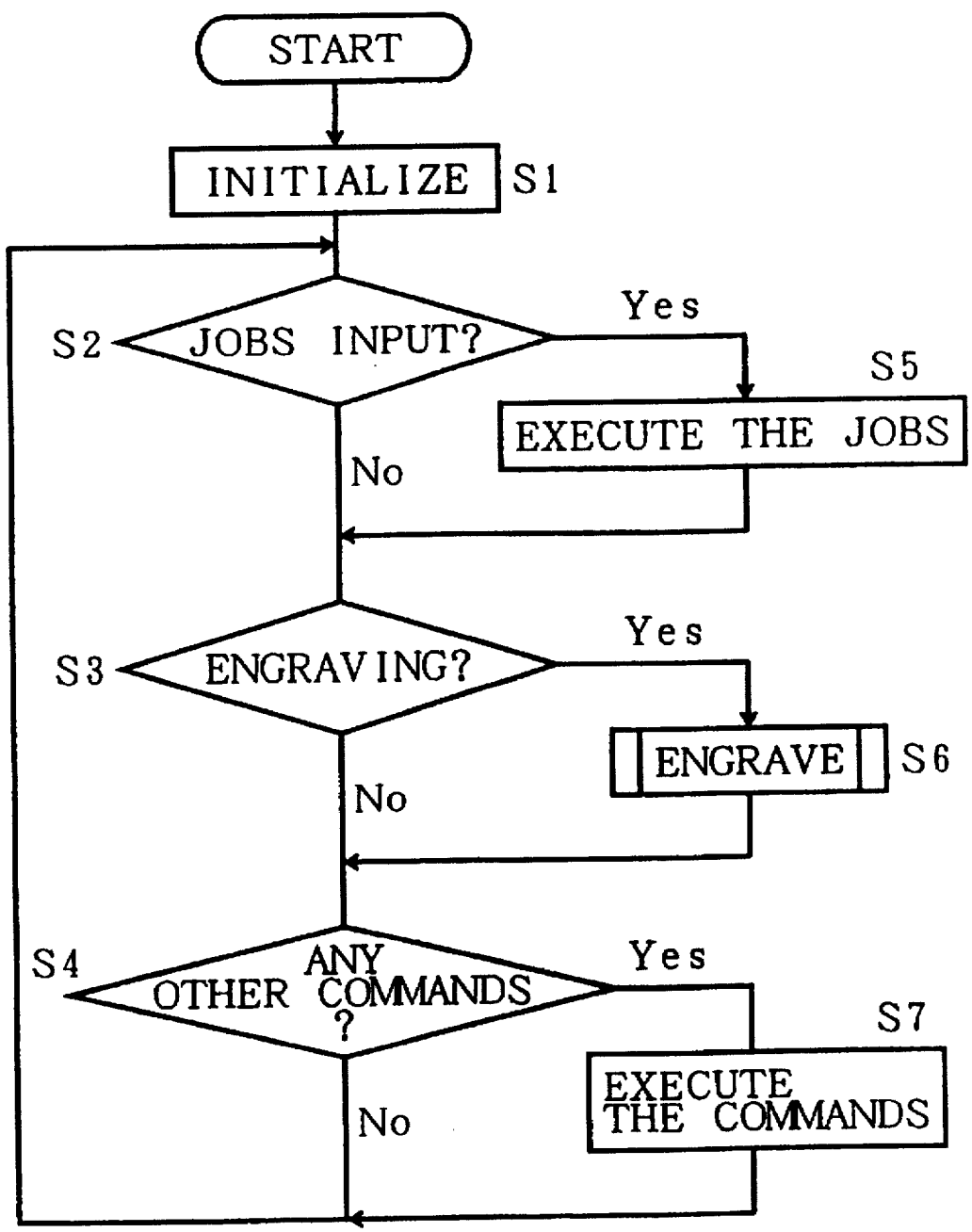
FIG. 10 is a flow chart illustrating control steps of the control unit attached to the main engraving unit.

As illustrated in FIG. 9, various components including the spindle motor 29, the layshaft motor 54, the stepping motor 59 for advancing and retracting the engraving head 56, a stylus drive unit 70 for driving the stylus 62, the tail stock motor 27, the quill cylinder 33, the quill lock cylinder 48, the tail stock lock cylinder 50, a memory unit 71 storing various set values, computed values and control programs, and other input/output units are connected to the main controller 10 in the control unit 3. Also, in the main controller 10, there are disposed an engraving start switch 72 in the operation panel 9, the three switches consisting of the tail stock advancing switch 43, the quill rearing switch 44 and the tail stock retiring switch 45 all arranged in the switch panel 42, the keyboard 12 in the control unit 3, the cylinder detecting sensor 68, the three sensors consisting of the quill proximate end detecting sensor 35, the quill distal end detecting sensor 34, the quill intermediate section detecting sensor 36 all arranged in the quill cylinder 33, and a layshaft encoder 73 detecting a rotational position of the layshaft motor 54.

The operation in the above-mentioned preferred embodiment will described below in conjunction with control flow charts illustrated in FIGS. 10 to 13.

When a start switch (not shown) of the engraving machine is turned on to start the program, initialization is first executed at Step S1. The machine is initialized to move the engraving head 56 to its original position (i.e., a position in the right of FIG. 2) and/or to perform various operations such as resetting a variety of flags and the like. At Step S2, it is determined if engraving conditions and/or data on an engraving image have been input (i.e., if JOB has been input). At Step S3, it is determined if the engraving start switch 72 has been turned on. At Step S4, it is determined if there are any other commands. When Steps S2 to S4 are all answered "NO", the procedure returns to Step S2.

If it is determined that a job has been inputed, the procedure proceeds from Step S2 to Step S5. At Step S5, the job, which includes engraving data to specify the size of the cylinder to be engraved, the number of lines representing resolution of an image, a screen angle representing a cell type, and an engraving position, and data of an image to be engraved, are executed.

If it is determined that the engraving start switch 72 has been turned on, the procedure proceeds from Step S3 to Step S6. At Step S6, engraving (discussed later) is executed. If any other commands are given, the procedure proceeds from Step S4 to Step S7. At Step S7, those commands for various jobs are executed.

In engraving at Step S6, cylinder setting (discussed later) is executed at Step S10 in FIG. 11. During this operation, the gravure cylinder C is held between the spindle 28 and the quill 32. At Step S11, the engraving table 23 is moved from its initial position in a secondary scan positive direction (to the left in FIG. 2). At Step 12, it is determined if the engraving table 23 has reached an outer diameter detecting position where the cylinder detecting sensor 68 can detect an outer circumference of the gravure cylinder C.

Since, as is discussed hereinbelow, the gravure cylinder C is chamfered to round its opposite end surfaces, the outer diameter detecting position is set to a position inside from each of the opposite end surfaces of the gravure cylinder C by a radius of a chamfered portion or longer. When the engraving table 23 reaches the outer diameter detecting position, the procedure proceeds to Step S13.

At Step S13, rotation of the layshaft motor 54 is stopped to stop the engraving table 23 in the outer diameter detecting position. At Step S14, the stepping motor 59 starts to advance the engraving head 56. At Step S15, it is determined if the cylinder detecting sensor 68 has been turned off (i.e., if it is shielded from light by the gravure cylinder C). The engraving head 56 is continually advanced till the cylinder detecting sensor 68 turns off. When the cylinder detecting sensor 68 turns off, the procedure proceeds to Step S16, where the stepping motor 59 is stopped to stop advancement of the engraving head 56. At Step S17, based upon a position where the engraving head 56 has stopped (hereinafter referred to as "outer circumference detecting position"), an outer diameter of the gravure cylinder C is computed as described below.

Figure 14:
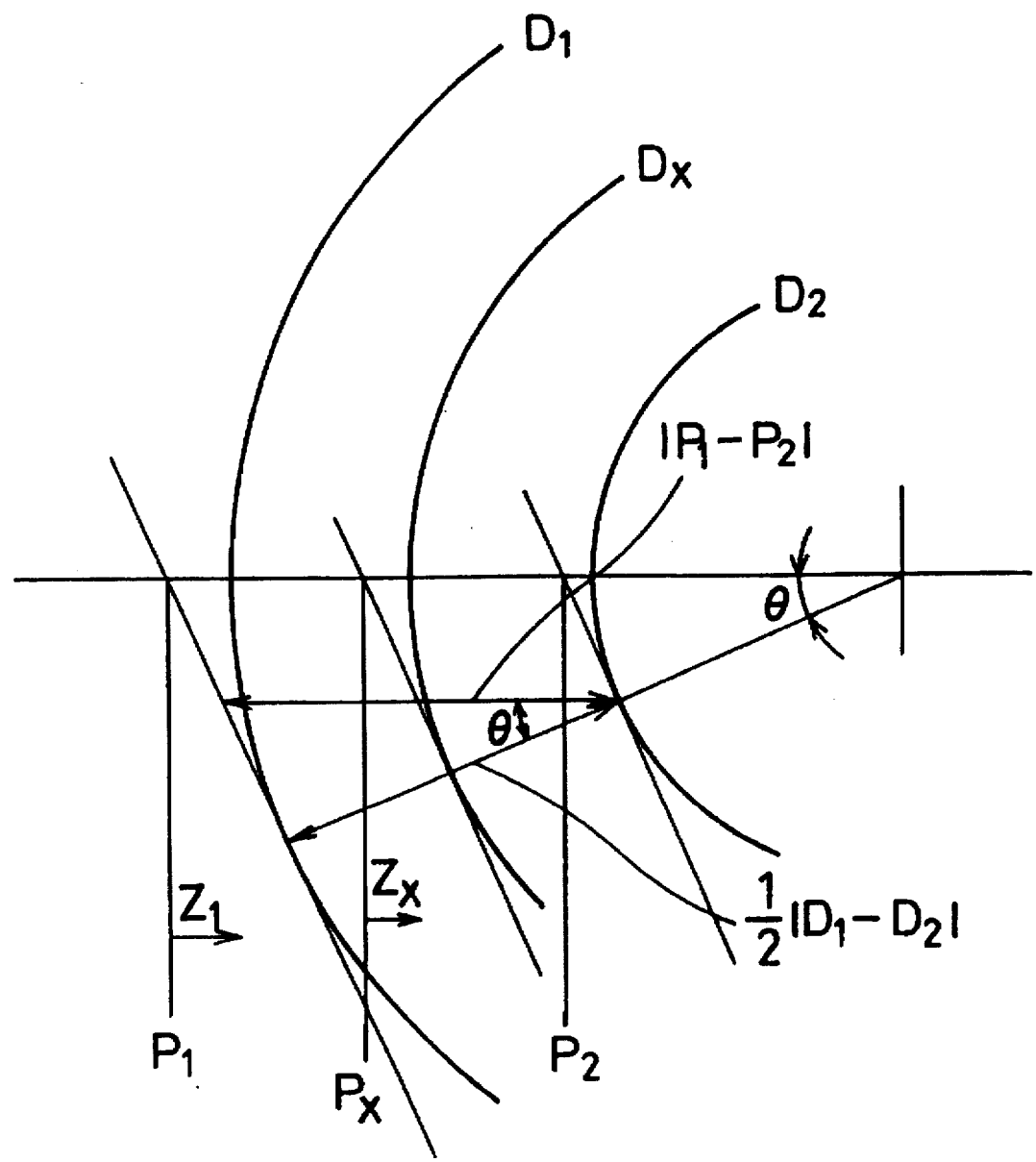
FIG. 14 is a diagram illustrating the position relationships relating to calculation of a diameter of a gravure cylinder as performed by the control unit.

Although an optical axis of the cylinder detecting sensor is adapted to orient about 20 deg. down forward, an orientation of the optical axis is calibrated in advance of delivery from the factory since actually it is hard to precisely adjust the optical axis. Such a calibrating method, as illustrated in FIG. 14, begins with preparing two gravure cylinders of whose diameters are identified. Herein, larger one of the diameters of the gravure cylinders is $D_1$ while the smaller one is $D_2$. Then, the gravure cylinders are attached to the machine, the engraving head 56 is put in the outer diameter detecting position, and the engraving head 56 is advanced to find the outer circumference detecting position where the cylinder detecting sensor 68 turns off. Assume now that outer circumferential detecting positions of the engraving head related to the individual gravure cylinders are $P_1$ and $P_2$. The outer circumference detecting positions are computed in accordance with the number of pulses given to the stepping motor 59. Those positions may be obtained by any other means like linear scale. An angle θ of the optical axis is calculated with the diameters $D_1$ and $D_2$ and the outer circumference detecting positions $P_1$ and $P_2$ as in the following equations:

$$\cos \theta = \frac{1}{2} * \text{ABS} [(D_1 - D_2)/P_1 - P_2)], \text{ or}$$

$$\theta = \cos^{-1} \{\frac{1}{2} * \text{ABS} [(D_1 - D_2)/P_1 - P_2)]\} \quad (1)$$

The angle θ of the optical axis Is computed in this way, and the angle θ, the diameter $D_1$ and the outer circumference detecting position $P_1$ are stored in the memory unit 71. In computing the diameter of the cylinder at Step S17, these factors are read from the memory unit 71, and the diameter is obtained in accordance with the following equation (2):

$$D_x = D_1 - 2(P_1 - P_x) \cos \theta \quad (2)$$

where $P_x$ is the outer circumference detecting position of the engraving head 56 at Step S16, and $D_x$ is the diameter of the gravure cylinder C. This operation is executed at Step S17.

When computation of the diameter of the cylinder is completed, the procedure proceeds to Step S18. At Step S18, the head supporting mount 57 is advanced to further advance the engraving head 56 by a distance $L_e$.

Figure 15:
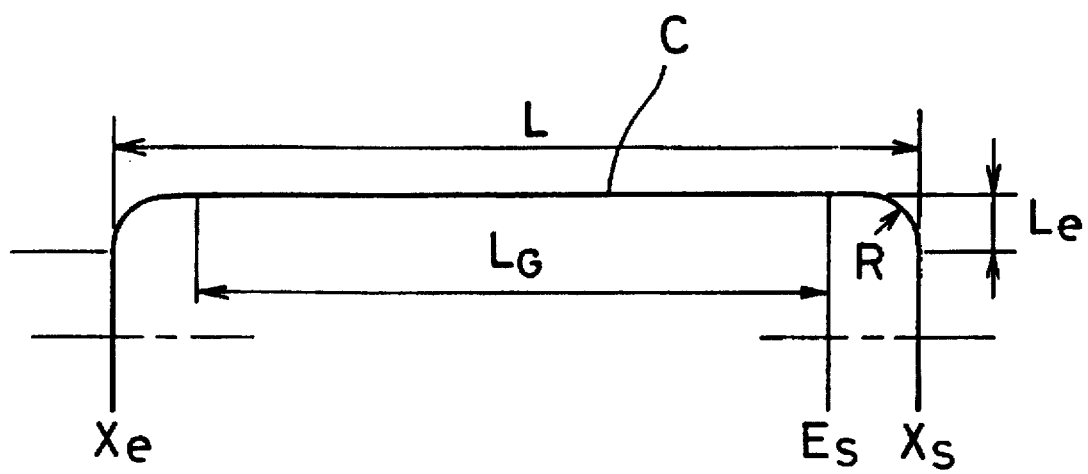
FIG. 15 is a diagram illustrating the position relationships relating to calculation of the length of a gravure cylinder as performed by the control unit.

The reason why the engraving head 56 is advanced from the outer circumference detecting position $P_x$ by the distance $L_e$ is that end surfaces of the gravure cylinder C should be accurately detected when the engraving table 23 is moved in a secondary scan negative direction at Step S19. The gravure cylinder C is, as shown in FIG. 15, chamfered to round its opposite end surfaces. Hence, if a length L of the gravure cylinder C is measured based upon the outer circumference detecting position $P_x$, the cylinder detecting sensor 68 once shielded from light comes to receive light at the very chamfered portions, and the end surfaces cannot be precisely detected. To avoid this, the engraving head 56 is advanced by the distance $L_e$ set longer than the radius of the chamfered portions.

At Step S19, the layshaft motor 54 is reversely rotated to move the engraving table 23 in the secondary scan negative direction. The "secondary scan negative direction" herein is a direction toward the right in FIG. 2. At Step S20, it is determined if the cylinder detecting sensor 68 has been turned on (i.e., if the sensor once shielded from light has come to receive light). Till the cylinder detecting sensor 68 turns on, the engraving table 23 is moved in the secondary scan negative direction. When the cylinder detecting sensor 68 turns on, the procedure proceeds to Step S21. At Step S21, a position $X_s$ of the engraving table 23 in the secondary scan direction at the very moment when the sensor turns on is found from a value of the layshaft encoder 73 and stored in the memory unit 71. In this way, first one of the end surfaces of the cylinder C is detected. At Step S22, the layshaft motor 54 is stopped to stop the engraving table 23. A stop position of the engraving table 23 is slightly close to its initial position from the position stored in the memory. At Step S23, the layshaft motor 54 is revolved in the forward direction again to move the engraving table 23 in the secondary scan positive direction. At Step S24, the cylinder detecting sensor 68 is forced to turn off. This is because of preventing the cylinder detection sensor 68 from detecting the first end surface of the cylinder. At Step S25, it is determined if the cylinder detection sensor 68 has turned on. In this way, the other end surface of the cylinder is detected. When the cylinder detecting sensor turns on, the procedure proceeds to Step S26. At Step S26, a position $X_e$ in the secondary scan direction at the very moment when the cylinder detection sensor 68 turns on is stored in the memory unit 71.

At Step S27, the layshaft motor 54 is stopped to stop movement of the engraving table 23. At Step S28, a length of the gravure cylinder C is computed. Herein, the length of the gravure cylinder L is calculated using the two positions, $X_s$ and $X_e$, in the secondary scan direction stored in the memory unit 71. At Step S29, an engraving start position $E_s$ is computed. The engraving start position $E_s$ is found in accordance with the following equation (3). In gravure engraving, generally, an image engraved in the gravure cylinder C is often positioned symmetrically about the center of the length of the cylinder, the engraving table 23 is moved to the engraving start position $E_s$ depending upon computation based upon the length L of the gravure cylinder and a length $L_G$ of the image.

$$E_s = \frac{1}{2}(X_s + X_e - L_G) + S \tag{3}$$

where S is a level of shift of the engraving table 23 without symmetrical engraving. The shift level S is set at "0" in initialization.

At Step S30, the stepping motor 59 is started to retire the engraving head 56 to the rearmost end. At Step S31, the layshaft motor 54 is started to move the engraving table 23 to the engraving star position $E_s$ computed at Step S29.

At Step S32, the stepping motor 59 is started to advance the engraving head 56 from the rearmost end to an engraving standard position to position the engraving head 56 at an initial position. The engraving standard position lies in a position where the sliding shoe 61 gets perpendicularly in touch with a tangent line of the gravure cylinder C and where the engraving head 56 is set upright. The engraving standard position is $P_x + Z_x$ away from the rearmost end. The position $P_x$, herein, is the previously mentioned outer circumference detecting position of the cylinder. A distance $Z_x$ is obtained by the following equation (4):

$$Z_x = Z_1 + \frac{1}{2}(D_x - D_1)(1/\cos\theta - 1) \tag{4}$$

where a distance $Z_1$ is found in advance by attaching a cylinder of diameter. $D_1$ to the machine before delivery from the factory. The distance $Z_1$ is obtained by first finding the engraving standard position of the engraving head 56 when the engraving head 56 erects in attaching the cylinder of diameter $D_1$ and then subtracting the outer circumference detecting position $P_1$ from the engraving standard position.

When the engraving head 56 is advanced by the sum of the distance $Z_x$ found in the equation (4) and the distance $P_x$ from its receding position, the engraving head 56 is set in the optimum engraving standard position. Thus the engraving head 56 is set in an initial position.

According to the equations (3) and (4), the engraving head automatically sets itself in the optimum engraving start position and engraving standard position (that is, the initial position) with a gravure cylinder of any size attached to the machine. Hence, variations in the engraving start position and in gap between the engraving head 56 and the gravure cylinder can be reduced.

At Step S33, the spindle motor 29 and the layshaft motor 54 are synchronously driven while the stylus drive unit 70 is driven in accordance with the data on engraving to operate the stylus 62 to practice engraving. At Step S34, it is determined if the engraving is completed. The end of the engraving is determined by the end of the data on engraving, for example. If it is determined that the engraving is completed, the procedure proceeds to Step S35. At Step S35, the engraving head 56 is returned to its original position. At Step S87, cylinder re-setting (explained below) is executed.

Figure 12:
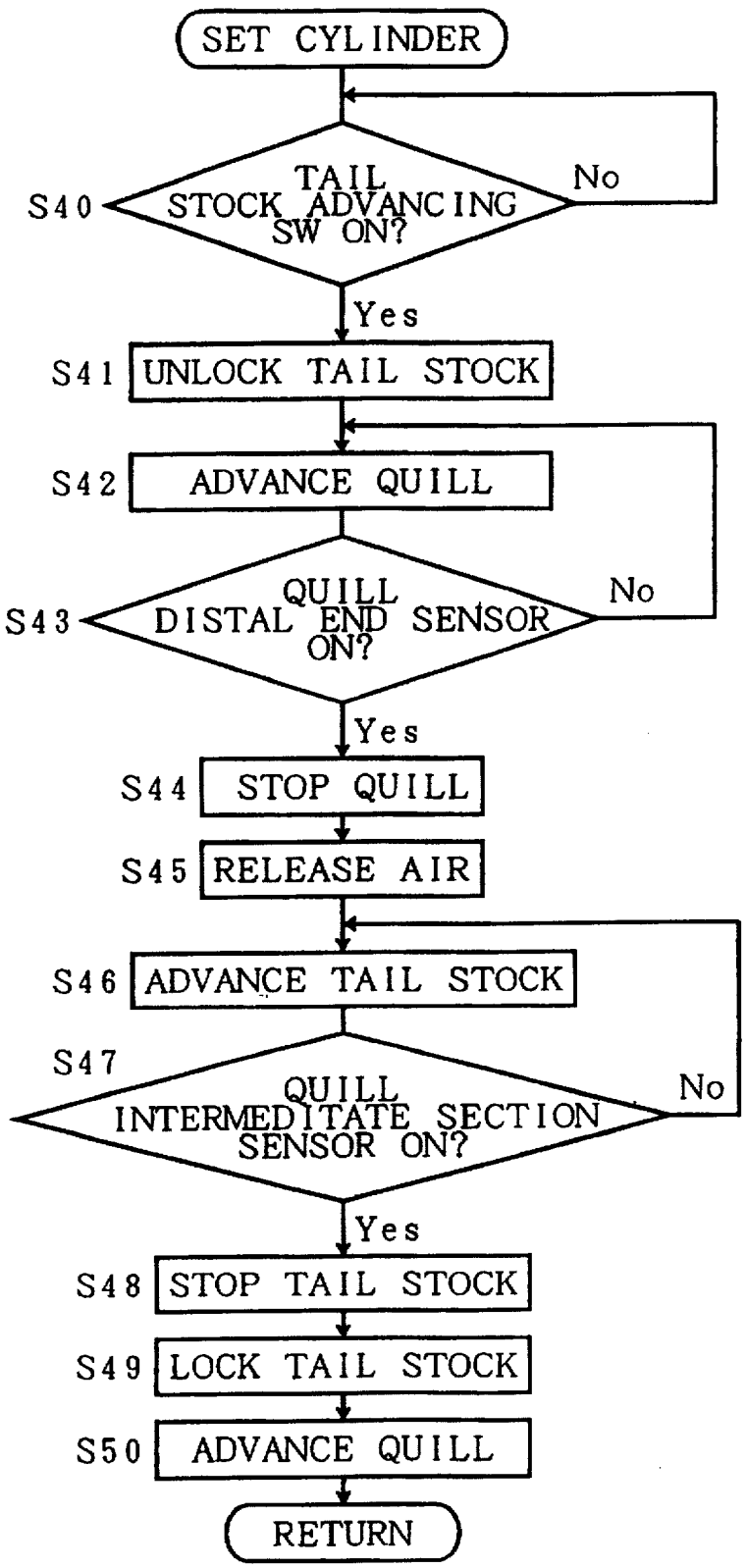
FIG. 12 is a flow chart illustrating further control steps of the control unit attached to the main engraving unit.

In setting the cylinder at Step S10, it keeps a stand-by state till the tail stock advancing switch 43 is turned on at Step S40 in FIG. 12. When the tail stock advancing switch 43 is operated, the procedure proceeds to Step S41. At Step S41, the tail stock lock mechanism 41 unlocks the tail stock 22. At Step S42, the quill cylinder 33 advances the quill 32. At Step S43, it is determined if the quill-distal-end detecting sensor 34 has turned on. The quill 32 is advanced till the quill-distal-end detecting sensor 34 turns on, and the procedure proceeds to Step S44 when the quill-distal-end detecting sensor 34 turns on. At Step S44, the quill cylinder 33 stops the quill 32. At Step S45, air within the quill cylinder 33 is released into the atmospheric air. In practice, when the quill cylinder is stopped at Step S44, the air within the cylinder is automatically released.

At Step S46, the tail stock motor 27 is started to advance the tail stock 22. Although the quill 32 gets in contact with an end of the gravure cylinder C as the tail stock 22 is advanced, the quill 32 can freely advance and retract since the air within the quill cylinder 33 is released to the atmospheric air. The quill 32 retracts after coming in contact with the gravure cylinder C. At Step S47, it is determined if the quill 32 which retracts in pace with advancement of the tail stock 22 has caused the quill-intermediate-section detecting sensor 36 to turn on. When the quill-intermediate-section detecting sensor 36 turns on, the procedure proceeds to Step S48. At Step S48, the tail stock motor 27 is stopped to stop the movement of the taft stock 22. At Step S49, the tail stock lock mechanism 41 locks the tail stock 22. At Step S50, the quill cylinder 33 is launched to let the quill 32 and the spindle 28 hold the gravure cylinder C therebetween, and the engraving is resumed.

A distance from the quill-intermediate-section detecting sensor 36 to the quill-proximate-end detecting sensor 35 is determined so that the gravure cylinder C does not fall from the quill 32 even if the quill 32 retracts from an intermediate position (i.e., a position where the quill-intermediate-section detecting sensor 36 turns on) to a rearmost end position (i.e., a position where the quill-proximate-end detecting sensor 35 turns on). Hence, the gravure cylinder C does not fall from the quill 32 if failure of the machine causes pressure relief during the operation and the weight of the gravure cylinder C makes the quill 32 recede.

Figure 11A:
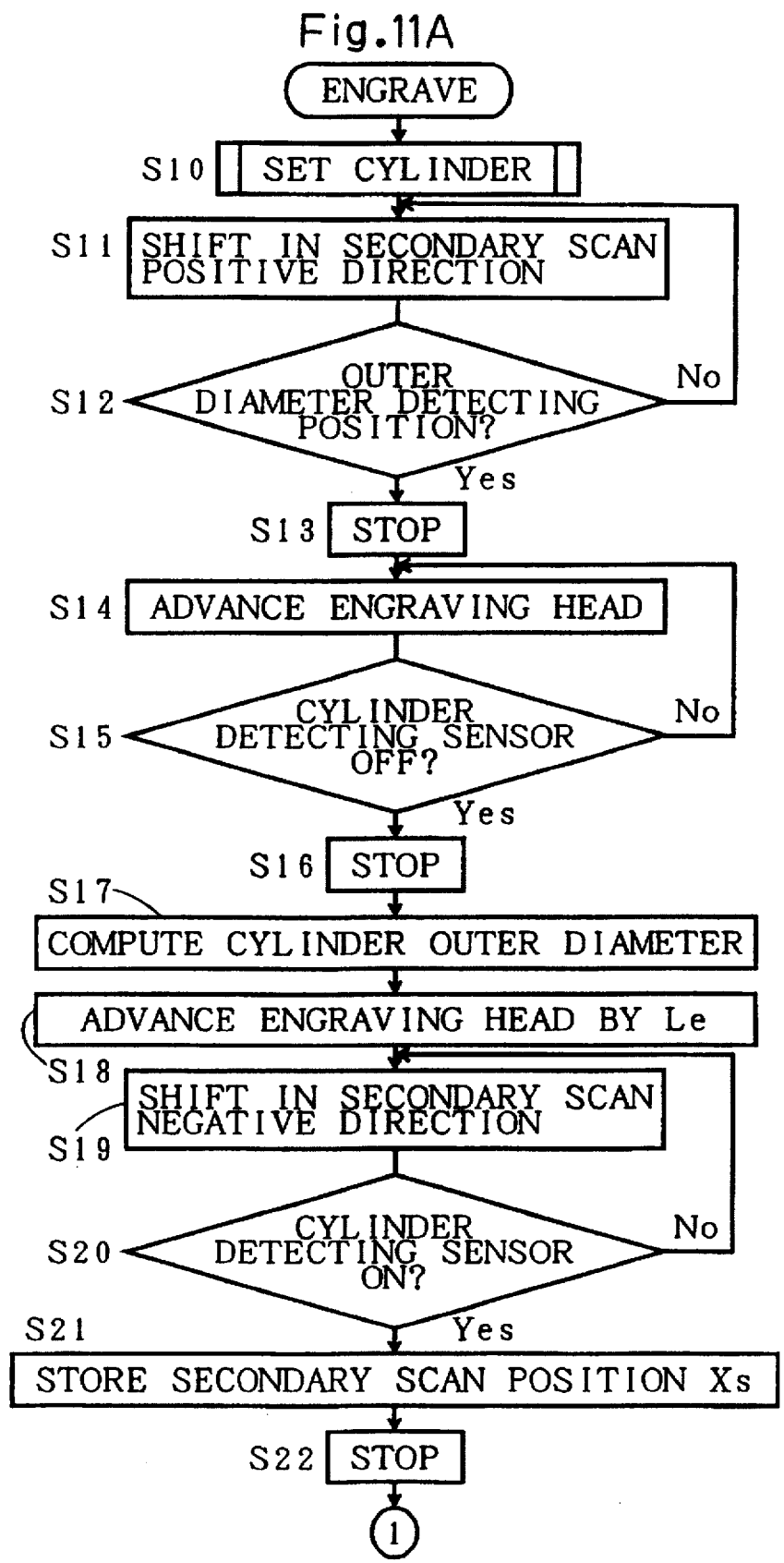
FIG. 11 (which includes figure portions FIGS. 11A and 11B) is a flow chart illustrating further control steps of the control unit attached to the main engraving unit.
Figure 11B:
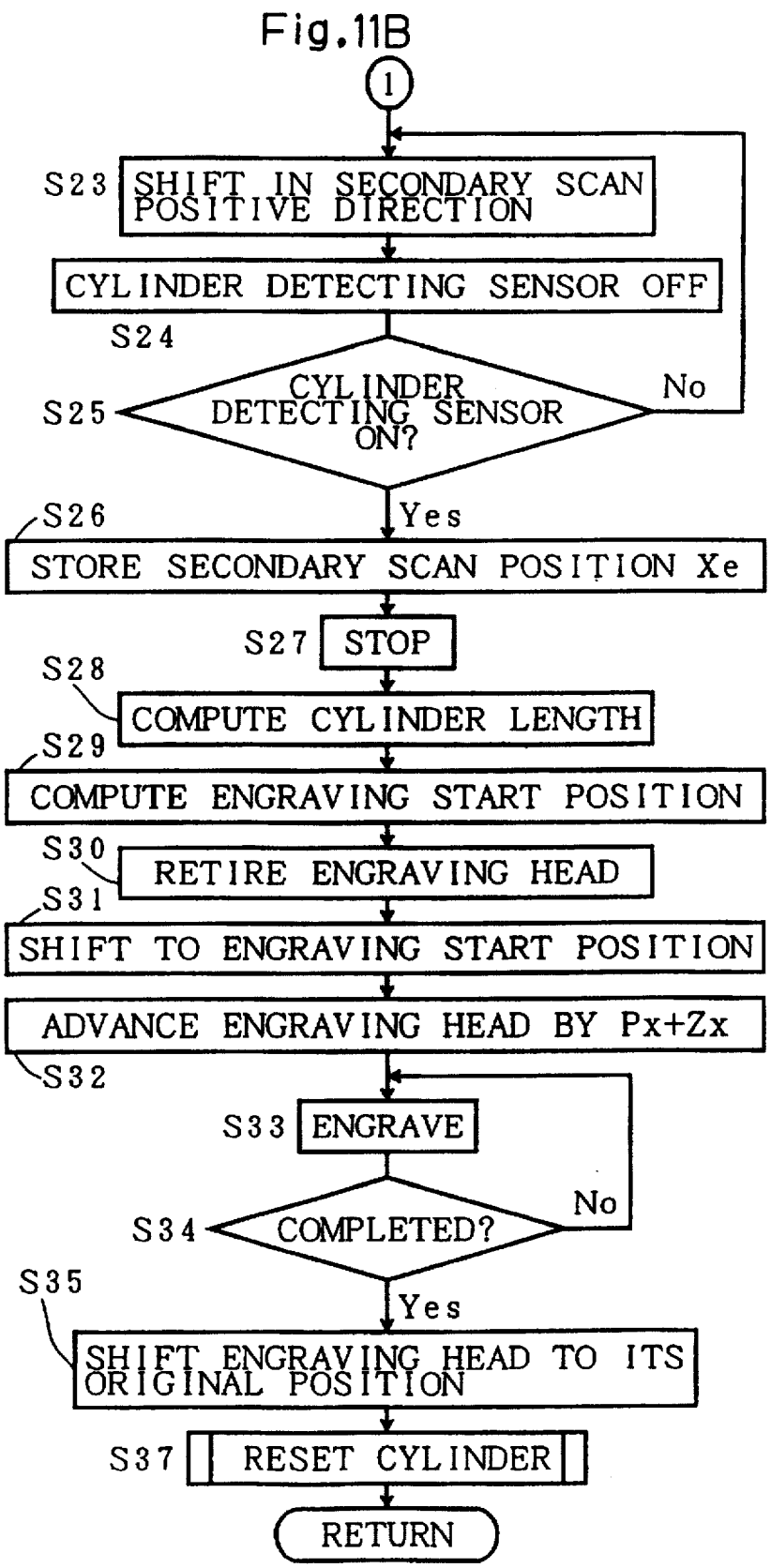
Figure 13:
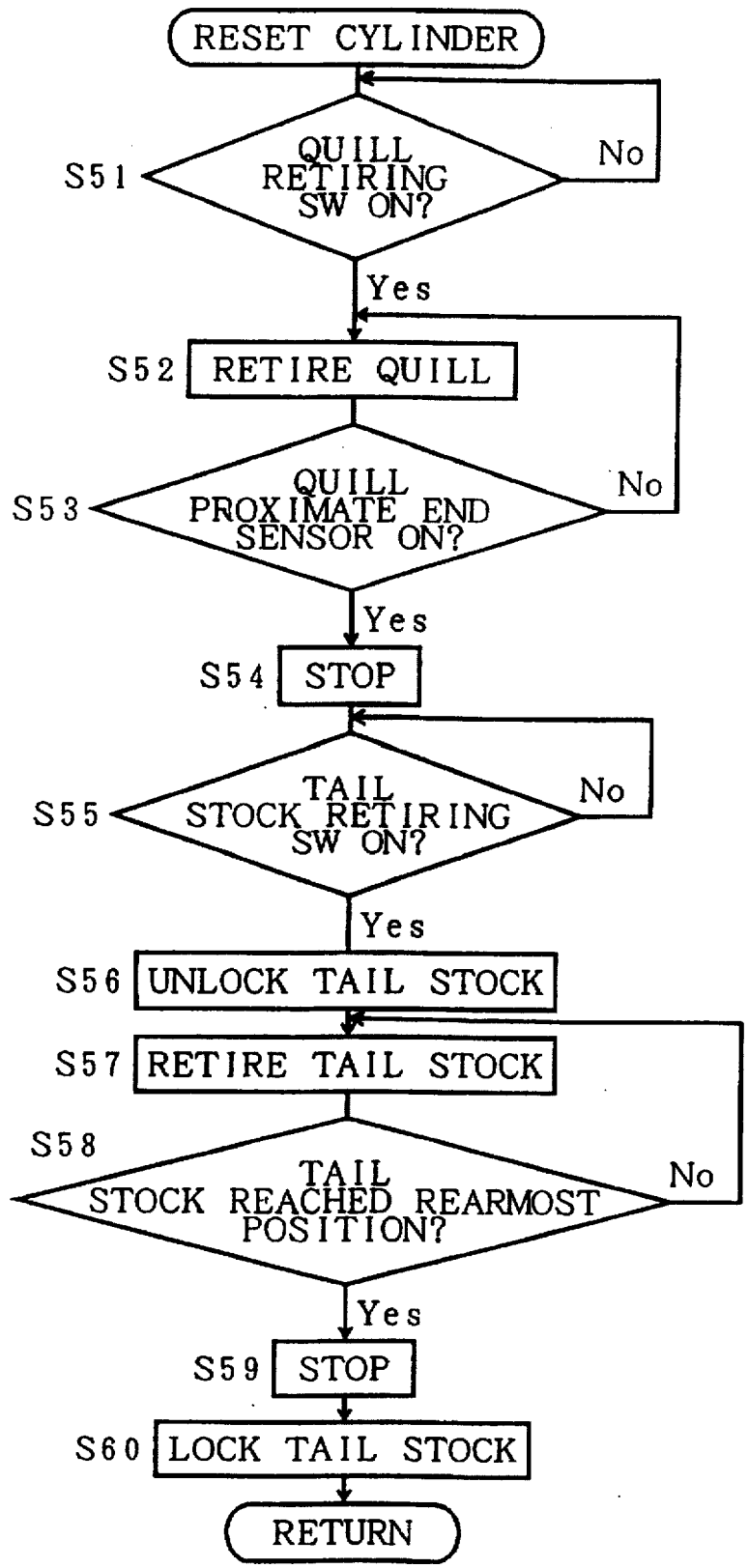
FIG. 13 is a flow chart illustrating further control steps of the control unit attached to the main engraving unit.

In resetting the cylinder at Step S38 in FIG. 11, it keeps a stand-by state till the quill retiring switch 44 is turned on at Step S51 in FIG. 13. When the quill retiring switch 44 is turned on, the procedure proceeds to Step S52. At Step S52, the quill cylinder 33 is driven, and the quill 32 is retracted till the quill-proximate-end detecting sensor 35 turns on at Step S53. Herein, as previously mentioned, the gravure cylinder C never fall between the intermediate position and the rearmost end position if the quill 32 retracts.

At Step S54, the quill cylinder 33 is stopped. At Step S55, it keeps a stand-by state till the tail stock retiring switch 45 is turned on. When the tail stock retiring switch 45 is turned on, the procedure proceeds to Step S56. At Step S56, the tail stock lock mechanism 41 unlocks the tail stock 22. At Step S57, the tail stock motor 27 is started to retire the tail stock 22. At Step S58, it keeps a stand-by state till the tail stock 22 reaches the rearmost end position. The decision, if it has reached the position, is made by a recession detecting sensor (not shown). When the tail stock 22 reaches the rearmost end position, the tail stock motor 27 is stopped (Step S59) to stop the tail stock 22. At Step S60, the tail stock lock mechanism 41 lock up the tail stock 22 on the guide rails 24, and the engraving is resumed.

In the above described invention, effects as stated below are expected:

(1) Because of its automatic advancement and retraction, the engraving head 56 can be easily repeatedly set to the initial position of the engraving head 56.

(2) Since the engraving head always keeps its attitude upright during the engraving operation regardless of a shape of the cylinder even after the same cylinder is used may times for engraving, cells obtained by the engraving operation are uniform in shape and touch of the sliding shoe 61 are stable to prevent the gravure cylinder C from being damaged.

(3) A diameter and length of the gravure cylinder C can be measured at reduced cost by the single cylinder detecting sensor 68.

(4) In accordance with the entire length of the gravure cylinder C and a length of an image, symmetrical engraving about the center of the image can be accurately and simply attained. Additionally, the engraving head 56 can be automatically set in an engraving start position for engraving operation.

(5) Since each gravure cylinder C has its opposite end surfaces held between the spindle 28 and quill 32, end surfaces edges may have any of a variety of shapes, since the engraving head can be set in a determined engraving start position based upon the dimensions of the cylinder.

(6) Since the diameter of the gravure cylinder C attached to the machine is practically measured, the operator may be informed of attachment of a cylinder that differs from that desired for a particular engraving process.

(7) All the operations after cylinder seating until cylinder resetting can be automated.

(8) Since the tail stock 22 can be adapted to work automatically during the cylinder resetting operations, all that the operator has to do manually is manipulate the cylinder to attach and remove it from the engraving machine.

(9) Since the quill 32 and the gravure cylinder C are in touch with each other while the quill cylinder is open to the atmosphere, that is, while the quill 32 freely advances and retracts, shock caused by touching is reduced. Air still remains in the quill cylinder 33, and the remaining air eases the shock.

It should be understood that the following modifications and other variations of the present invention are possible:

(a) An angle θ of a rear shaft of the cylinder detecting sensor 68 is not restricted to 20 deg. but it may take any value.

(b) The cylinder detecting sensor of light emitting/receiving type may be replaced with a reflection type optical sensor. With the reflection type optical sensor, however, curved surface of a rounded or chamfered portion of the cylinder is detected as being shorter than an actual length, and thus, a detection result must be accordingly corrected.

(c) The optical cylinder detecting sensor may be replaced with other types of sensors including an electrostatic capacity type sensor and a non-contact type sensor. A contact type sensor may be used.

(d) A diameter and a length may be respectively detected by separate sensors.

(e) A quill advancing switch to manually advancing the quill 32 may be newly provided, so that the quill 32 does not proceed unless the quill advancing switch is pushed immediately before Step S50.

Although the present invention has been described with reference to various preferred embodiments, the invention is not limited to the detail set forth above. Other substitutions and modifications which may occur to those of ordinary skill in the art are intended to follow within the scope and spirit of the invention as set forth in the appended claims.

What is claimed:

1. An engraving head control device for a gravure engraving machine having an engraving head for engraving a gravure cylinder according to engraving data, comprising:

a first moving means for supporting an engraving head on a gravure engraving machine for selectively advancing and retracting said engraving head to and from a gravure cylinder mounted on said engraving machine;

a second moving means mounted to said gravure engraving machine for moving said engraving head along the length of said gravure cylinder;

an initial position computing means for computing initial position data corresponding to an initial position of said engraving head with respect to said gravure cylinder; and a position controlling means for controlling said first moving means and said second moving means to position said engraving head in said initial position in accordance with said computed initial position data before engraving begins.

2. An engraving head control device as in claim 1, further comprising:

a sensing means moving with said engraving head for sensing the relative position of said engraving head with respect to said gravure cylinder; and said initial position computing means connected to said sensing means, computing the diameter of the gravure cylinder in response to output from said sensing means; and said position controlling means controlling the first moving means in accordance with the computed diameter of said gravure cylinder to position said engraving head at a predetermined distance away from said gravure cylinder.

3. An engraving head control device as in claim 2, wherein said sensing means includes a light emitter which emits a light beam parallel to a diameter of said gravure cylinder, and a light receiver which directly receives said light beam emitted from said light emitter; and said first moving means moves said sensor means together with said engraving head forward and backward with respect to said engraving cylinder in response both to the reception of said light beam by said light receiver and to the interruption of said light beam by said gravure cylinder.

4. An engraving head control device as in claim 3, wherein said light emitter emits said light beam at a predetermined angle measured from the vertical toward said gravure cylinder; and said initial position computing means computes the diameter of said gravure cylinder based on said angle of said light beam, and the position of said sensing means when said light beam is broken by said gravure cylinder as said sensing means is moved toward said gravure cylinder.

5. An engraving head control device as in claim 1, further comprising:

a sensing means moving with said engraving head for sensing the relative position of said engraving head with respect to said gravure cylinder;

wherein said initial position computing means computes the length of said gravure cylinder in response to output from said sensing means and computes an engraving start position based upon engraving data and the computed length of said gravure cylinder; and said position controlling means controlling the second moving means to move said engraving head to said computed engraving start position.

6. An engraving head control device as in claim 5, wherein said sensing means includes a light emitter which emits a light beam parallel to a diameter of said gravure cylinder, and a light receiver which receives said light beam emitted from said light emitter; and said second moving means moves said sensor means together with said engraving head along said axial length of said gravure cylinder in response to both the reception of said light beam by said light receiver and the interruption of said light beam by said gravure cylinder.

7. An engraving head control device for a gravure engraving machine having an engraving head for engraving a gravure cylinder according to engraving data comprising:

a head moving means coupled to an engraving head for advancing and retracting said engraving head with respect to the gravure cylinder;

a sensing means coupled to said engraving head and moving therewith for generating detecting signals which indicate relative position of said engraving head with respect to the gravure cylinder;

a computing means for computing a diameter of the gravure cylinder in response to output from said sensing means; and a position controlling means for controlling the head moving means in accordance with the diameter of the gravure cylinder to position said engraving head a predetermined distance away from said gravure cylinder.

8. An engraving head control device as in claim 7, wherein said sensing means generates detecting signals indicative of the two end portions of said gravure cylinder;

said computing means computes the length of the gravure cylinder in response to output from said sensing means and computes an engraving start position based upon engraving data and the length of the gravure cylinder; and said position controlling means controls said head moving means to position said engraving head to said computed engraving start position.

9. An engraving head control device for a gravure engraving machine having an engraving head for engraving a gravure cylinder according to engraving data, comprising:

a head moving means supported on a gravure engraving machine, connected to an engraving head on said gravure engraving machine, for moving said engraving head along the axial length of a gravure cylinder mounted on said gravure engraving machine;

a sensing means for generating detecting signals which indicate the two end portions of the gravure cylinder;

a computing means for computing the length of the gravure cylinder in response to output from said sensing means and computing an engraving start position based upon engraving data and the length of the gravure cylinder; and a position controlling means for controlling said head moving means to move the engraving head to the engraving start position.

10. An engraving head control device as in claim 9, wherein said sensing means being coupled to said engraving head and moving therewith for generating detection signals indicative of relative position of said engraving head with respect to the gravure cylinder;

said computing means computing a diameter of the gravure cylinder in response to output from said sensing means; and said position controlling means controlling the head moving means in accordance with the diameter of said gravure cylinder to position said engraving head a predetermined distance away from the gravure cylinder.

11. An engraving head control device for a gravure engraving machine having an engraving head for engraving a gravure cylinder according to engraving data, comprising:

a first moving device supporting an engraving head on a gravure engraving machine for selectively advancing and retracting said engraving head to and from a gravure cylinder mounted on said engraving machine;

a second moving device mounted to said gravure engraving machine and moving said engraving head along the length of said gravure cylinder;

an initial position computing unit computing initial position data corresponding to an initial position of said engraving head with respect to said gravure cylinder; and a position controlling unit for controlling said first moving means and said second moving device to position said engraving head in said initial position in accordance with said computed initial position data before engraving begins.

12. An engraving head control device as in claim 11, further comprising:

a sensing device moving with said engraving head and sensing the relative position of said engraving head with respect to said gravure cylinder; and said initial position computing unit connected to said sensing device, computing the diameter of the gravure cylinder in response to output from said sensing device; and said position controlling unit controlling the first moving device in accordance with the computed diameter of said gravure cylinder to position said engraving head at a predetermined distance away from said gravure cylinder.

13. An engraving head control device as in claim 11, further comprising:
- a sensing device moving with said engraving head for sensing the relative position of said engraving head with respect to said gravure cylinder;
- wherein said initial position computing unit computes the length of said gravure cylinder in response to output from said sensing device and computes an engraving start position based upon engraving data and the computed length of said gravure cylinder; and
- said position controlling unit controlling the second moving device to move said engraving head to said computed engraving start position.

14. An engraving head control device for a gravure engraving machine having an engraving head for engraving a gravure cylinder according to engraving data comprising:
- a head moving device coupled to an engraving head for advancing and retracting said engraving head with respect to the gravure cylinder;
- a sensing device coupled to said engraving head and moving therewith for generating detecting signals which indicate relative position of said engraving head with respect to the gravure cylinder;
- a computing unit computing a diameter of the gravure cylinder in response to output from said sensing device; and
- a position controlling unit controlling the head moving device in accordance with the diameter of the gravure cylinder to position said engraving head a predetermined distance away from said gravure cylinder.

15. An engraving head control device as in claim 14, wherein said sensing device generates detecting signals indicative of the two end portions of said gravure cylinder;
- said computing unit computes the length of the gravure cylinder in response to output from said sensing device and computes an engraving start position based upon engraving data and the length of the gravure cylinder; and
- said position controlling unit controls said head moving device to position said engraving head to said computed engraving start position.

16. An engraving head control device for a gravure engraving machine having an engraving head for engraving a gravure cylinder according to engraving data, comprising:
- a head moving device supported on a gravure engraving machine, connected to an engraving head on said gravure engraving machine, for moving said engraving head along the axial length of a gravure cylinder mounted on said gravure engraving machine;
- a sensing device generating detecting signals which indicate the two end portions of the gravure cylinder;
- a computing unit computing the length of the gravure cylinder in response to output from said sensing device and computing an engraving start position based upon engraving data and the length of the gravure cylinder; and
- a position controlling unit controlling said head moving device to move the engraving head to the engraving start position.

17. An engraving head control device as in claim 16, wherein said sensing device being coupled to said engraving head and moving therewith for generating detection signals indicative of relative position of said engraving head with respect to the gravure cylinder;
- said computing unit computing a diameter of the gravure cylinder in response to output from said sensing device; and
- said position controlling unit controlling the head moving device in accordance with the diameter of said gravure cylinder to position said engraving head a predetermined distance away from the gravure cylinder.

* * * * *